US012574121B2

(12) United States Patent　　　　(10) Patent No.:　US 12,574,121 B2
Iqbal et al.　　　　　　　　　　　　(45) Date of Patent:　Mar. 10, 2026

(54) SYSTEM AND METHOD FOR TIME SYNCHRONIZATION

(71) Applicant: ARQIT LIMITED, London (GB)

(72) Inventors: Omar Iqbal, Petersfield (GB); Alexander Koehler-Sidki, Ely (GB)

(73) Assignee: Arqit Limited, London (GB)

( * ) Notice: Subject to any disclaimer, the term of this patent is extended or adjusted under 35 U.S.C. 154(b) by 233 days.

(21) Appl. No.: 18/283,900

(22) PCT Filed: Feb. 21, 2022

(86) PCT No.: PCT/GB2022/050459
§ 371 (c)(1),
(2) Date: Sep. 25, 2023

(87) PCT Pub. No.: WO2022/200757
PCT Pub. Date: Sep. 29, 2022

(65) Prior Publication Data
US 2024/0162992 A1　　May 16, 2024

(30) Foreign Application Priority Data
Mar. 26, 2021　(GB) ..................................... 2104318

(51) Int. Cl.
*H04B 10/70*　　　　(2013.01)
*H04B 10/118*　　　(2013.01)
*H04L 9/08*　　　　(2006.01)

(52) U.S. Cl.
CPC ........... *H04B 10/70* (2013.01); *H04B 10/118* (2013.01); *H04L 9/0852* (2013.01)

(58) Field of Classification Search
CPC ....... H04L 9/08; H04L 9/0852; H04L 7/0075; H04B 10/70; H04B 10/118
See application file for complete search history.

(56) References Cited

U.S. PATENT DOCUMENTS 9,800,352 B2 * 10/2017 Frohlich ............ H04B 10/2581
2020/0150240 A1 * 5/2020 Huwer ................. G01S 7/4865

FOREIGN PATENT DOCUMENTS

WO　　2019205214　　10/2019

OTHER PUBLICATIONS

Liao, SK., Cai, WQ., Liu, WY. et al. Satellite-to-ground quantum key distribution. Nature 549, 43-47 (2017). https://doi.org/10.1038/nature23655 (Year: 2017).*

(Continued)

*Primary Examiner* — Kara E. Geisel
*Assistant Examiner* — Christina I Xing
(74) *Attorney, Agent, or Firm* — Dentons US LLP

(57)　　　　ABSTRACT

A method for time synchronisation in a satellite based quantum key distribution system, by at a transmitter, emitting a first series of laser pulses (LP) encoded to form a quantum beam, emitting a second series of LP having a predetermined repeating pattern; at a receiver, receiving the first and second series of LP and determining reception times of pulses of the first and second series of LP; comparing the second series of LP to the predetermined pattern and determining the point at which the received second series of LP is most correlated to the predetermined pattern; determining a relationship fitting reception times of a plurality of the received pulses to emission times of corresponding ones of the second series of LP; and using the determined relationship to convert between reception times of the first series of LP and emission times of corresponding ones of the first series of LP.

20 Claims, 8 Drawing Sheets

(56)     References Cited

OTHER PUBLICATIONS

Takenaka Hideki et al., "Satellite-to-ground quantum-limited communication using a 50-kg-class microsatellite," Nature Photonics, vol. 11, No. 8, Aug. 1, 2017, pp. 502-508.

* cited by examiner

Photon pulses generated at
SAT with reference to SAT clock

Photon pulses detected at OGR
with reference to OGR clock

SYSTEM AND METHOD FOR TIME SYNCHRONIZATION

This application is the National Stage filing under 35 U.S.C. 371 of International Application No. PCT/GB2022/050459, filed Feb. 21, 2022, claims the benefit of GB Application No. 2104318.7, filed Mar. 26, 2021, the contents of which are all hereby incorporated by reference herein in their entirety.

The present application relates to a method, system and software for time synchronisation, and in particular for time synchronisation in a quantum key distribution system.

BACKGROUND

Cryptography is used to protect billions of transactions every day from, without limitation, for example Transport Layer Security (TLS) security for online shopping and banking to ultra-secure government communications. These transactions rely on reliable and secure means for at least two or more transacting parties to share a secret key, enabling encryption of data by one party and subsequent decryption by other parties.

It is expected that when commercially usable universal quantum computers (QC) become available, a variety of types of transactions, tasks and applications including, without limitation, conventional key distribution processes will be vulnerable. QCs can potentially crack many classical cryptography codes almost effortlessly. The conventional manual key distribution process is not quantum secure by its nature of operation, as it is exposed to both quantum electronic and/or physical compromise at several of the steps involved.

It has been proposed to use quantum key distribution (QKD) to allow two distant parties to share a key in an information theoretic secure way that is guaranteed by the laws of physics. Significant progress has been carried out in recent years on implementing this over fibre. However, the loss experienced over terrestrial links severely limits the achievable distance. By utilising the negligible loss experienced by photons travelling through most of the atmosphere, satellite based QKD can overcome these limitations and enable inter-continental QKD. However, in order to enable satellite based QKD an improved method for time synchronisation between a satellite and a ground station is needed.

The embodiments described below are not limited to implementations which solve any or all of the problems of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

In a first aspect, the present disclosure provides a method of time synchronisation in a satellite based quantum key distribution (QKD) system, the method comprising: at a transmitter, emitting a first series of laser pulses, the first series of laser pulses being encoded to form a quantum beam; at the transmitter, emitting a second series of laser pulses, the second series of laser pulses having a predetermined repeating pattern; and at the transmitter, sending the first and second series of laser pulses to a receiver; at a receiver, receiving the first series of laser pulses and the second series of laser pulses at the receiver and determining reception times of pulses of the first series of laser pulses and pulses of the second series of laser pulses; comparing the received second series of laser pulses to the predetermined pattern at different points in the predetermined pattern, and determining the point at which the received second series of laser pulses is most strongly correlated to the predetermined pattern; with the received second series of laser pulses aligned to the predetermined pattern at the determined point, determining a relationship fitting respective reception times of a plurality of the received second series of laser pulses to respective emission times of corresponding ones of the second series of laser pulses; and using the determined relationship to convert between reception times of the first series of laser pulses and emission times of corresponding ones of the first series of laser pulses.

In a second aspect, the present disclosure provides a system for time synchronisation in a satellite based quantum key distribution (QKD) system, the system comprising: a transmitter arranged to: emit a first series of laser pulses, the first series of laser pulses being encoded to form a quantum beam; emit a second series of laser pulses, the second series of laser pulses having a predetermined repeating pattern; and sending the first and second series of laser pulses to a receiver; and a receiver arranged to receive the first series of laser pulses and the second series of laser pulses and determine reception times of pulses of the first series of laser pulses and pulses of the second series of laser pulses; the system being arranged to: compare the received second series of laser pulses to the predetermined pattern at different points in the predetermined pattern, and determine the point at which the received second series of laser pulses is most strongly correlated to the predetermined pattern; with the received second series of laser pulses aligned to the predetermined pattern at the determined point, determine a relationship fitting respective reception times of a plurality of the received second series of laser pulses to respective emission times of corresponding ones of the second series of laser pulses; and use the determined relationship to convert between reception times of the first series of laser pulses and emission times of corresponding ones of the first series of laser pulses.

In a third aspect, the present disclosure provides a method of time synchronisation at a receiver in a satellite based quantum key distribution (QKD) system, the method comprising: receiving a first series of laser pulses encoded to form a quantum beam and a second series of laser pulses having a predetermined repeating pattern, and determining reception times of pulses of the first series of laser pulses and pulses of the second series of laser pulses; comparing the received second series of laser pulses to the predetermined pattern at different points in the predetermined pattern, and determining the point at which the received second series of laser pulses is most strongly correlated to the predetermined pattern; with the received second series of laser pulses aligned to the predetermined pattern at the determined point, determining a relationship fitting respective reception times of a plurality of the received second series of laser pulses to respective emission times of corresponding ones of the second series of laser pulses; and using the determined relationship to convert between reception times of the first series of laser pulses and emission times of corresponding ones of the first series of laser pulses.

In a fourth aspect, the present disclosure provides a system for time synchronisation in a satellite based quantum key distribution (QKD) system, the system comprising a receiver arranged to: receive a first series of laser pulses encoded to form a quantum beam and a second series of laser pulses having a predetermined repeating pattern, and to determine reception times of pulses of the first series of laser pulses and pulses of the second series of laser pulses; compare the received second series of laser pulses to the predetermined pattern at different points in the predetermined pattern, and determine the point at which the received second series of laser pulses is most strongly correlated to the predetermined pattern; with the received second series of laser pulses aligned to the predetermined pattern at the determined point, determine a relationship fitting respective reception times of a plurality of the received second series of laser pulses to respective emission times of corresponding ones of the second series of laser pulses; and use the determined relationship to convert between reception times of the first series of laser pulses and emission times of corresponding ones of the first series of laser pulses.

In a fifth aspect, the present disclosure provides a method of time synchronisation at a transmitter in a satellite based quantum key distribution (QKD) system, the method comprising: emitting a first series of laser pulses, the first series of laser pulses being encoded to form a quantum beam; emitting a second series of laser pulses, the second series of laser pulses having a predetermined repeating pattern; and sending the first and second series of laser pulses to a receiver.

In a sixth aspect, the present disclosure provides a system for time synchronisation in a satellite based quantum key distribution (QKD) system, the system comprising: a transmitter arranged to: emit a first series of laser pulses, the first series of laser pulses being encoded to form a quantum beam; emit a second series of laser pulses, the second series of laser pulses having a predetermined repeating pattern; and send the first and second series of laser pulses to a receiver.

In a seventh aspect, the present disclosure provides a computer-readable medium comprising code or computer instructions stored thereon, which when executed by a processor, causes the processor to perform the method according to any one of the first, third, or fifth aspects.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
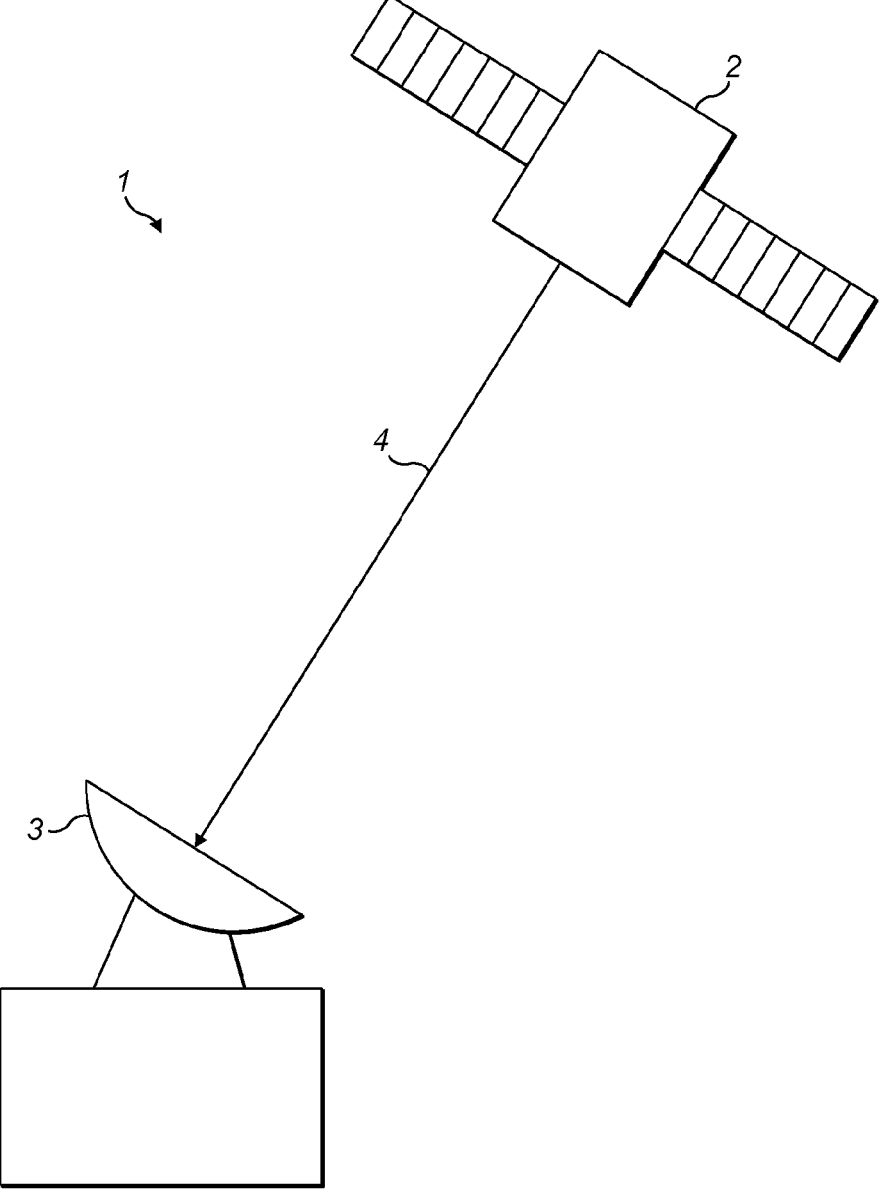
FIG. 1 is a schematic diagram illustrating a satellite quantum key distribution system according to a first embodiment of the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a schematic overview of a part of a satellite based quantum key distribution (QKD) system.

As shown in FIG. 1, satellite based quantum key distribution (QKD) system 1 comprises a satellite 2 and an optical ground receiver (OGR) 3 at a ground station. During a QKD session, the satellite 2 sends a quantum beam 4 comprising a series of single photons, or weak laser pulses attenuated such that each pulse contains a mean photon number of less than one, down to the OGR 3 with a particular repetition rate. Accordingly, in the illustrated example the satellite 2 acts a transmitter of the quantum beam 4, and the OGR 3 acts as a receiver of the quantum beam 4. In the illustrated example the quantum beam 4 comprises a series of laser pulses attenuated to the single-photon level. When the OGR 3 detects the laser pulses these detection events are time-stamped by the OGR 3. The OGR 3 and the satellite 2 then perform several post-processing steps. An example of one of these post-processing steps is basis reconciliation. In basis reconciliation, the basis choices for each detection event at the OGR 3 are compared to sending events at the satellite 2, and compatible detection events, that is, detection events which have compatible basis choices to sending events at the satellite 2, of single-photon laser pulses are retained and used as bases for subsequent encryption key negotiations, while detection events with incompatible bases are discarded. However, this requires the two parties to ensure they are comparing the same corresponding bits, such that every photon ID at the OGR matches the photon ID at the satellite. The photon IDs are the temporal labels for photon transmission and detection events.

For the satellite 2 and the OGR 3 to perform the required basis reconciliation and other post-processing steps to turn raw detection events into a secure key, the satellite 2 and the OGR 3 need to be very closely synchronised. This means that the satellite 2 and the OGR 3 must be able to match the sending event of a laser pulse at the satellite 2 to the detection event of the same laser pulse at the OGR 3. This is not a straightforward problem. In practice, because the laser pulses are single-photon events in order to provide the required quantum uncertainty, many sent photons are lost during transmission and never received by the OGR 3. Further, because the satellite 2 is in orbit, the satellite 2 is constantly moving relative to the OGR 3, so that the distance between the satellite 2 and the OGR 3 and the relative velocities of the satellite 2 and the OGR 3 are constantly changing. As a result, the link distance travelled by the quantum beam 4 between the satellite 2 and the OGR 3 is constantly changing, so that the time offset between the sending times at the satellite 2 and the reception times at the OGR 3 is constantly changing, and the repetition rate of the laser pulses received at the OGR 3 is also constantly changing due to Doppler shift. As a result, the synchronisation tolerances are very stringent. Hence a robust method for time-synchronisation is needed.

The present disclosure provides a means enabling the satellite and the OGR to synchronise their timings, so that their respective photon event identities can be synchronised and correlated so that they can perform the necessary QKD key post-processing steps on an aligned data set to allow them to share an identical secure key.

It will be understood that the satellite based QKD system 1 has many additional elements which are not shown in FIG. 1, and will not be described herein. FIG. 1 is merely an explanatory diagram to assist in explaining the requirement for time synchronisation of the optical link between the satellite 2 and the OGR 3. Further, it will be understood that the QKD operation has numerous further steps in addition to basis reconciliation.

An overview of the present disclosure is for the satellite 2 to use a separate synchronisation laser operating at a wavelength well separated from the any other transmitted beams, such as the quantum beam 4. The synchronisation laser sends strong pulses at a lower repetition rate than the quantum beam, and having a pseudo random pattern. These pulses from the synchronisation laser are sent, along with the quantum beam 4, down to the OGR 3 where they are separated by their wavelength, for example by using a dichroic mirror. The time synchronisation pulses sent by the synchronisation laser are detected by a dedicated detector, such as a photodiode. The OGR 3 matches its detections of the synchronisation pulses to its knowledge of the pseudo random pattern transmitted from the satellite 2 to establish the correct temporal starting point for the quantum beam 4. The OGR 3 may use a polynomial fit to establish the relationship between the actual system repetition rate and the assumed repetition rate, to synchronise the timing at the satellite 2 and the OGR 3. This established relationship can then be used to enable the photon detection events at the OGR 3 to be mapped to the photon transmission events at the satellite 2 (i.e. matching of photon IDs), such that the satellite 2 and the OGR 3 can perform the steps of key post-processing processing, such as error correction and privacy amplification, on the same transmitted and received bits.

Figure 2A:
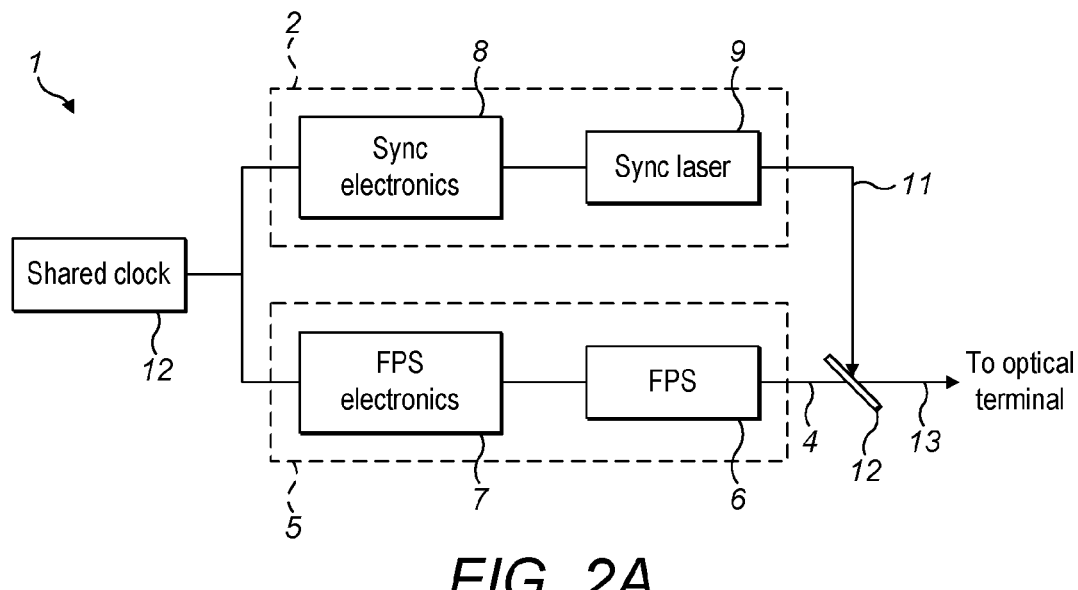
FIG. 2A is a schematic diagram illustrating a satellite based part of a synchronisation system according to the first embodiment.
Figure 2B:
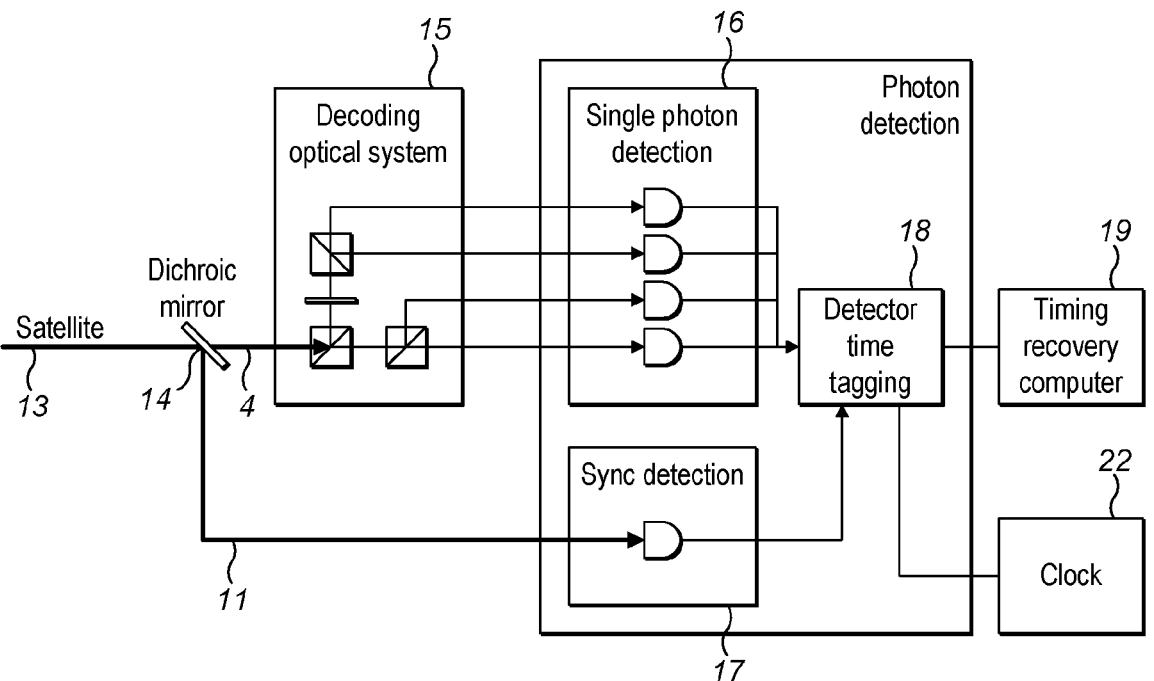
FIG. 2B is a schematic diagram illustrating a ground based part of a synchronisation system according to the first embodiment.

FIG. 2A shows a schematic diagram of a part of a time synchronisation system located on a satellite 2, while FIG. 2B shows a schematic diagram of a part of a time synchronisation system located at an OGR 3.

In FIG. 2A, the satellite 2 comprises an optical pulse generator 5, which produces a series of faint laser pulses at a first wavelength to form the quantum beam 4 at the first wavelength. The pulse generator 5 comprises a faint pulse laser system 6 controlled by pulse electronics 7. The faint pulse laser system 6 generates faint laser pulses at the first wavelength which are attenuated to single photon events, which faint laser pulses form the quantum beam 4 suitable for use in quantum key delivery (QKD) protocols. The pulse electronics 7 control the faint pulse laser system 6 to generate faint laser pulses allowing individual photons to be encoded for QKD protocols, such as prepare and measure QKD protocols. In the illustrated example, the emitted faint laser pulses are assigned photon IDs corresponding to the clock cycle of a shared clock 12 at which they are emitted. In the illustrated example the QKD system 1 operates using the BB84 polarisation encoding protocol, and the faint pulse laser system 6 comprises means to assign a polarisation state to each faint laser pulse. In some examples the faint pulse laser system 6 may contain a single photon source together with means to assign a polarisation state to each faint laser pulse.

The satellite 2 further comprises a synchronisation pulse generator 8, which produces a series of laser pulses at a second wavelength to form a synchronisation beam at the second wavelength. The synchronisation pulse generator 8 comprises a synchronisation laser 9 controlled by synchronisation electronics 10. The synchronisation laser 9 produces synchronisation pulses at the second wavelength to form the synchronisation beam 11. The first wavelength of the quantum beam 4 and the second wavelength of the synchronisation beam 11 are different wavelengths. The satellite 2 further comprises a shared clock 12, which provides common timing signals to both the pulse electronics 7 of the pulse generator 5 and the synchronisation electronics 10 of the synchronisation pulse generator 8.

The quantum beam 4 and the synchronisation beam 11 are combined or multiplexed by a first dichroic mirror 12 of the satellite 2 into a single combined beam 13. The combined beam 13 is directed to the OGR 3 by output optics of the satellite 2 (not shown).

In FIG. 2B, the OGR 3 receives the combined beam 13 from the satellite 2 using input optics of the OGR 3 (not shown). The OGR 3 comprises a second dichroic mirror 14, which separates or demultiplexes the received combined beam 13 into the quantum beam 4 and the synchronisation beam 11.

As discussed above, the first wavelength of the quantum beam 4 and the second wavelength of the synchronisation beam 11 are different wavelengths. The first and second wavelengths must be sufficiently different to allow robust separation or demultiplexing of the quantum beam 4 and the synchronisation beam 11 based on their wavelengths by the second dichroic mirror 14. However, the precise wavelengths used quantum beam 4 and the synchronisation beam 11 may be selected as appropriate in any specific implementation.

The OGR 3 comprises a decoding optical system 15 and a number of single photon detectors 16, which receive the quantum beam 4 and detect single photon reception events of the quantum beam 4. In the illustrated example of FIG. 2B, the decoding optical system 15 is arranged to decode according to the BB84 polarisation encoding protocol, and the decoding optical system 15 is a polarisation analyser. The OGR 3 further comprises a synchronisation pulse detector 17, which receives the synchronisation beam 11 and detects synchronisation pulse events of the synchronisation beam 11.

The respective outputs of the single photon detectors 16 and the synchronisation pulse detector 17 are provided to a time tagger 18, which time stamps the single photon reception events detected by the single photon detectors 16 and the received synchronisation pulse events detected by the synchronisation pulse detector 17 using a clock signal from a local clock 22 of the OGR 3.

The OGR 3 further comprises a timing recovery module 19, which analyses the timing of the received synchronisation pulse events based on their time stamps to carry out a time recovery operation and determine the timing difference, which may be referred to as the delta time ($\Delta t$), between the sending of the faint laser pulses by the satellite 2 and detection of the corresponding received single photons at the OGR 3, and adjusts or converts the timing of the single photon reception events as indicated by their respective time stamps accordingly, to enable correct matching of the sent faint laser pulses to the received single photons.

Figure 3:
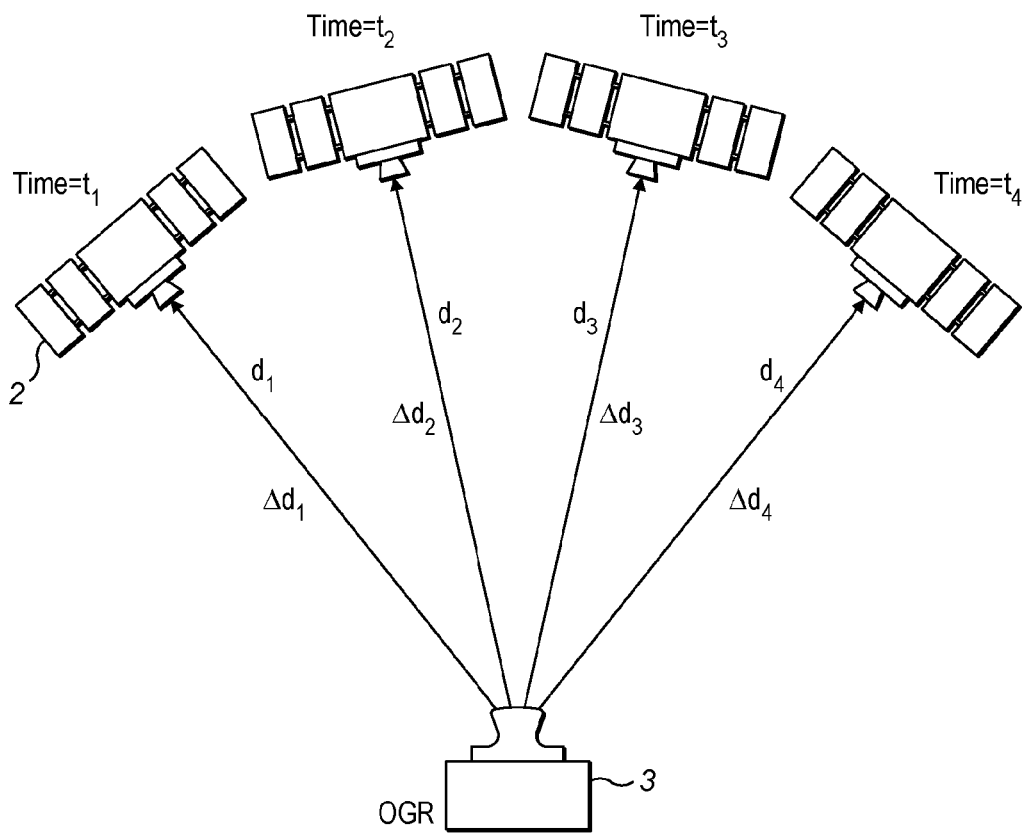
FIG. 3 is an explanatory diagram illustrating some possible timing problems.

FIG. 3 is an explanatory diagram illustrating some timing issues which may affect the QKD system 1 in operation.

As shown in FIG. 3, as the satellite 2 passes over the OGR 3 during a QKD communication session both the position and the velocity of the satellite 2 relative to the OGR 3 will continuously change throughout the communication session. As a result, for successive positions of the satellite 2 at successive times $t_1$ to $t_4$, the respective path distance $d_1$ to $d_4$ of the quantum beam 4 between the satellite 2 and the OGR 3 may be different, and the respective rate of change of the path distance $\Delta d_1$ to $\Delta d_4$ of the quantum beam 4 between the satellite 2 and the OGR 3 may also be different. The path distance between the satellite 2 and the OGR 3 is temporarily static, and the rate of change of this path distance is temporarily zero, when the satellite 2 is at zenith. However, this is only the case for a very short period, and it is impractical for a satellite QKD system to function only in the short period when the satellite 2 is at zenith relative to the OGR 3. In practice, the system 1 must be able to operate in the more general case when the path distance and the rate of change of the path distance may be continually changing. As a result of these changes, the time required for the photons transmitted in the quantum beam 4 to travel from the satellite 2 will continuously change, and the rate of this change will also continuously change. This continually changing Doppler shift will result in a small, but continuous, change in the effective pulse repetition rate of the faint laser pulses received at the OGR 3, compared to the actual pulse repetition rate of these pulses transmitted by the satellite 2. Although this is a small change, the cumulative effect would, if not corrected, cause synchronisation between the satellite 2 and the OGR 3 to quickly fail, typically in less than second. As a result, it may be difficult to correlate which photon detection events at the OGR 3 correspond to which photon transmission events at the satellite 2, making QKD protocols, which depend upon such correlation, unreliable. In addition to the timing changes resulting from the relative movement of the satellite 2 and OGR 3, there may also be unpredictable random short time scale errors in pulse generation, pulse detection, and time tagging, generally referred to as timing jitter. In the illustrated example, the first wavelength is 850 nm. This is not essential, and other wavelengths may be used in alternative examples.

Figure 4A:
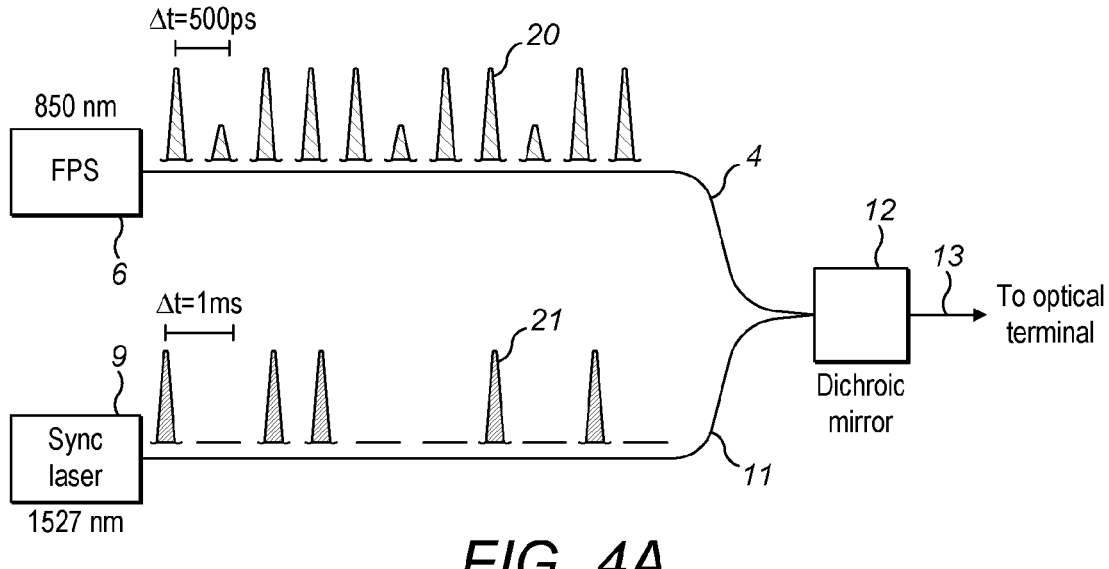
FIG. 4A is schematic diagram illustrating laser pulse sequences generated on board the satellite according to the first embodiment.

FIG. 4A shows a schematic diagram showing laser pulse sequences of the quantum beam 4 and the synchronisation beam 11 generated on board the satellite 2.

As shown in FIG. 4A, the faint pulse laser system 6 generates faint laser pulses 20 at the first wavelength which are attenuated to single photon events, which faint laser pulses 20 form the quantum beam 4 suitable for use in QKD protocols, in the illustrated example, the BB84 protocol. In the illustrated example, the faint pulse laser system 6 emits pulses 20 at a frequency of around 2 GHz, so that the pulses are separated by around 500 ps. Accordingly, the errors and/or uncertainty in the relative timings of pulse emission at the satellite 2 and pulse reception at the OGR 3 should be in the order of hundreds of picoseconds or less in order for the emitted and received photons to be correctly and unambiguously correlated.

The synchronisation laser 9 generates synchronisation laser pulses 21 at a second wavelength which form the synchronisation beam 11. The emission of the synchronisation laser pulses 21 and the faint laser pulses 20 are synchronised by the satellite 2, and any fixed timing offset between them is determined and provided to the OGR 3 in advance of the QKD communication session. This offset for the satellite 2 may be distributed to all OGRs 3 in the QKD system 1 by a system controller of the QKD system 1. As discussed above, the quantum beam 4 and the synchronisation beam 11 are combined by the first dichroic mirror 12 into a single combined beam 13, which is transmitted to the OGR 3. In the illustrated example, the second wavelength is 1525 nm. This is not essential, and other wavelengths may be used in alternative examples.

The synchronisation laser pulses 21 are emitted with a predetermined data baud rate, or repetition rate, in a pseudo random pattern having a predetermined length and frame rate. The baud rate is the symbol rate of the synchronisation beam 11 signal, which may be regarded as the repetition frequency of synchronisation laser 9, assuming that a pulse 21 were sent in every time interval, although for the time correlation procedure, some pulses are blocked to allow '0s' to be sent as well as '1s' as symbols to form the pseudo random pattern. In the illustrated example, the baud rate or repetition rate is around 1 kHz, so that the pulse positions are separated by about 1 ms, and the pseudo random pattern has a length of 3 seconds, and thus a frame rate of about 0.33 Hz. The pseudo random pattern comprises digital ones and zeros represented by the presence and absence of a pulse 21 at each pulse position. It should be noted that the illustrated time separations between the faint laser pulses 20 and the synchronisation laser pulses 21 are not shown to scale in the figures.

The pseudo random pattern used at the satellite 2 is known to the OGR 3 in advance. Conveniently, the satellite 2 can always use the same pseudo random pattern, and all satellites 2 in a QKD system 1 can use the same pseudo random pattern, so that the OGRs 3 of the system 1 only need to know a single, fixed, pseudo random pattern. However, in principle, the pseudo random pattern used can change over time and/or be different for different satellites, provided that this is known to the OGR 3. In the illustrated embodiment, the pseudo random pattern is a de Bruijn sequence with a length of 3 seconds. This is not essential, and other patterns and/or lengths of the synchronisation laser pulses 21 may be used in alternative examples.

Using a pseudo-random pattern rather than an alternating sequence of ones and zeros makes the procedure significantly more robust to missed pulses. A useful way of defining the sequence is to use de Bruijn sequences, which are strings which contain all possible substrings of a particular length exactly once. For example, assuming an alphabet of size n=2 (corresponding to 0 and 1) and a substring length of k=3, the de Bruijn sequence would be as follows: 0 0 0 1 0 1 1 1. In general, the length of the de Bruijn sequence is $n^k$.

The pattern used for the synchronisation pulses should be pseudo random, non-repeating and ideally balanced, having an equal number of 1s and 0s, so that the OGR 3 cannot inadvertently lock onto the wrong part of the pattern. However, the use of a de Bruijn sequence may provide improved resilience to mismatching or signal noise.

Figure 4B:
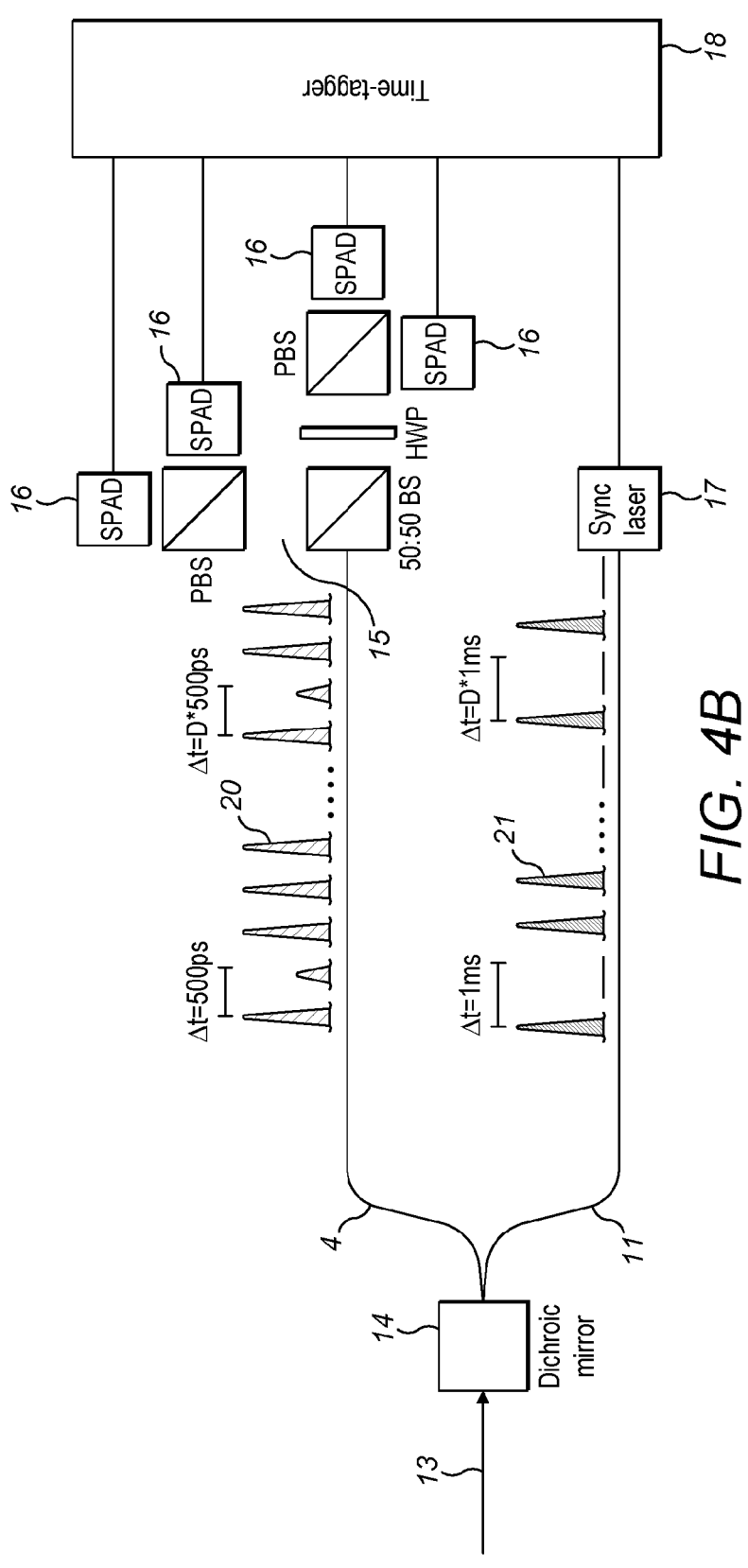
FIG. 4B is schematic diagram illustrating laser pulse sequences received at a ground station according to the first embodiment.

FIG. 4B shows a schematic diagram showing laser pulse sequences of the quantum beam 4 and the synchronisation beam 11 received at the OGR 3.

The OGR 3 receives the combined beam 13 from the satellite 2, and the combined beam 13 is separated by the second dichroic mirror 14 into the quantum beam 4 and the synchronisation beam 11. The faint laser pulses 20 of the quantum beam 4 then go to the decoding optical system 15 (the polarisation analyser) and single photon detectors 16, and the synchronisation pulses 21 of the synchronisation beam 11 go to the synchronisation pulse detector 17. Both faint laser pulse 20 and synchronisation pulse 21 detection events are time-stamped with reference to the same OGR local clock by the time tagger 18.

The timing recovery module 19 carries out a time correlation process to determine a time correction which can be used to transform or convert the timings of the single photon reception events detected by the single photon detectors 16 at the OGR 3 to the timings of the corresponding faint laser pulse emissions at the satellite 2, and so synchronise these timings. It will be understood that this time correction is not a fixed value, but varies over time, because the path distance of the quantum beam 4 between the satellite 2 and the OGR 3 varies over time, and the effective repetition rate of the received pulses is changing due to Doppler shift as a result of relative movement of the satellite 2 with respect to the OGR 3.

Figure 5:
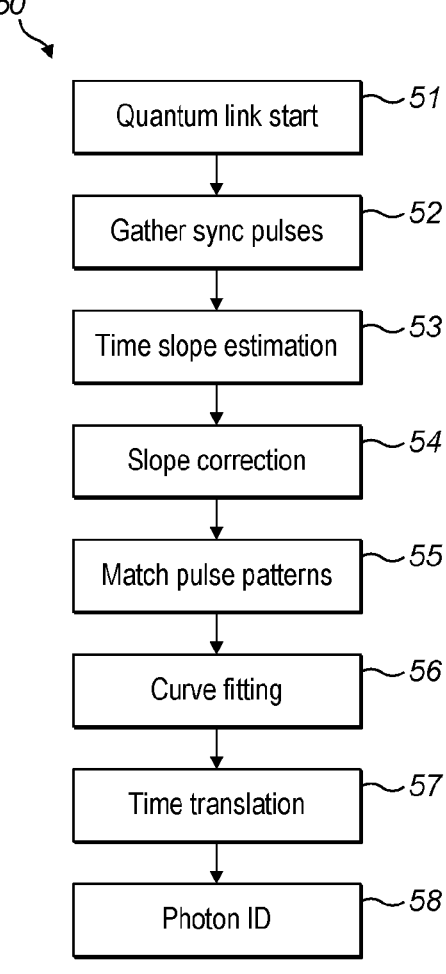
FIG. 5 is a schematic diagram illustrating a flow chart of a time correlation process by the ground station according to the first embodiment.

FIG. 5 shows a flow chart of a time correlation process 50 carried out by the OGR 3 according to the first embodiment. Although the satellite 2 generates the pulses 20 and 21 of the quantum beam 4 and the synchronisation beam 11, the satellite 2 does not carry out the time correlation process 50, which is carried out entirely at the OGR 3.

The start time for a QKD session between the satellite 2 and the OGR 3 is scheduled in advance. Generally, such scheduling is carried out in advance for the QKD system 1 as a whole by a central control station, and an agreed start time for the establishment of a quantum communications link between the satellite 2 and the OGR 3 is set and communicated to the satellite 2 and the OGR 3. At the agreed quantum link start time, the satellite 2 generates the first synchronisation pulse 21 and the first faint laser pulse 20 simultaneously, using the synchronisation laser 9 and the faint pulse laser system 6.

The time correlation process 50 begins when the first synchronisation pulse 21 of the QKD session is detected by the synchronisation pulse detector 17 of the OGR 3 in a quantum link start block 51. It should be understood that it is possible that the first synchronisation pulse 21 which is detected may not be the first synchronisation pulse 21 which was transmitted, because it is possible that the first one or more synchronisation pulses 21 may have been lost, that is, transmitted but not received.

Received synchronisation pulses 21 detected by the synchronisation pulse detector 17 are time-tagged, or time stamped, with the time of receipt according to a clock of the OGR 3 by the time tagger 18, and provided to the timing recover module 19, in a gather synchronisation pulses block 52.

The gathered synchronisation pulses are then analysed by the timing recovery module 19 in a time slope estimation block 53. The timing recovery module 19 analyses the time separation of the detected synchronisation pulses and uses this to estimate the relative time slope, or clock slope, that is, the difference between the measured repetition rate (baud rate) of the synchronisation pulses received at the OGR 3 according to the clock of the OGR 3 and the known repetition rate (baud rate) of the synchronisation pulses sent by the satellite 2 according to the clock 12 of the satellite 2. This clock slope difference will comprise both differences in the actual clock rates of the clocks used by the satellite 2 and the OGR 3, and also changes between the sent and received pulse timings due to Doppler effects. Doppler effects in this case are the shift in the measured repetition rate that results due to motion of the satellite 2 towards or away from the OGR 3 as it carries out a pass, which changes the path length between the satellite 2 and the OGR 3, and so changes the travel time of the synchronisation pulses 21 and the faint laser pulses 20 between the satellite 2 and the OGR 3. At zenith, the distance between the satellite 2 and OGR 3 is fixed, and hence there is no Doppler shift at this time.

The timing recovery module 19 identifies the first pulse detected by the synchronisation pulse detector 17 as the first pulse in the frame. The timing recovery module 19 then determines an expected last pulse time which is one transmitted frame time (the known time taken to transmit the full pseudo random pattern at the satellite 2) later than the time at which the first pulse was received. The timing recovery module 19 then identifies the detected pulse with a reception time closest to the expected last pulse time as the last pulse in the frame. The following pulse is then identified as the first pulse of the next frame, and the process is repeated to identify the last pulse of the next frame, and so on.

This simple manner of identifying the first and last pulses of each transmitted pseudo random pattern assumes that the clock slope errors are relatively small, so that the accumulated error over a full frame of the pseudo random pattern is less than half the time between successive synchronisation pulses, so that it is easy to identify the last pulse of a pseudo random pattern frame based on timing. In the illustrated example where the transmitted frame time is 3 seconds and the pulse rate or baud rate is 1 kHz, this requires an accumulated error of less than 0.5 ms after 3 seconds. A difference in clock rate at the satellite 2 and OGR 3 of about 1 second per day would have an error of 0.034 ms after 3 seconds, and clocks having this level of error are readily available. Further, Doppler effects are expected to be relatively small, because satellite orbital velocities are small compared to the speed of light. For example, for a clock rate of 2 GHz at the satellite 2 and the OGR 3 it is expected that a worst case change in received clock rate would be no more than about +/−50 kHz. Accordingly, it is expected that it will be straightforward in practice to select clock sources and baud and frame rates which allow this simple approach to be used.

When a full frame of the pseudo random pattern has been received, the timing recovery module 19 identifies the first and last pulses in the frame, that is, the first and last pulses of the full frame of the pseudo random pattern, as discussed above, and compares the timings of the first and last pulses using their time stamps to determine the time difference between them. As is discussed above, the OGR 3 knows the baud rate and the frame rate of the pseudo random pattern sent by the satellite 2. Accordingly, the timing recovery module can determine the clock slope difference by comparing the measured time taken to receive the full pseudo random pattern at the OGR 3, the received frame time, to the known time taken to transmit the full pseudo random pattern at the satellite 2, the transmitted frame time, and determining the time difference between the measured receiving time and the known transmitted time. The timing recovery module 19 then divides the number of symbols in a complete frame of the pseudo random pattern by the determined time difference to calculate the clock slope in terms of a frequency difference between the baud rate of the transmitted pseudo random pattern at the satellite 2, which is based on the clock rate of the shared clock 12 of the satellite 2, and the apparent baud rate of the pseudo random pattern received at the OGR 3 according to the local clock 22 of the OGR 3. The clock frequencies of the shared clock 12 and the local clock 22 are intended to be the same, so this determined clock slope frequency difference will comprise frequency differences in the transmitted and received baud rates due to any difference in the actual clock frequencies of the shared clock 12 and the local clock 22 together with effects due to the relative movement of the satellite 2 and the OGR 3. It will be understood that, as explained above, the first synchronisation pulse detected is not necessarily the first synchronisation pulse sent, and so may not be the actual first pulse in a frame of the pseudo random pattern. However, since the synchronisation laser pulses 21 are emitted with a predetermined data baud rate this will not affect the calculation of the clock slope.

Determining the clock slope across a full frame length of the pseudo random pattern comprising multiple pulses reduces the effect of timing errors (jitter) associated with individual pulses, and may allow a more accurate determination of the clock slope. The jitter associated with individual pulses is made up of short time scale errors in the pulse generation, pulse detection, and time tagger systems for both the faint pulse laser pulses 20 and the synchronisation laser pulses 21. This jitter is noise which needs to be filtered out by the time correlation process 50, and this filtering out is assisted by determining the clock slope across a full frame of the pseudo random pattern.

When a full frame of the pseudo random pattern has been received, and the clock slope for this received frame has been calculated, the timing recovery module 19 uses the calculated clock slope to carry out an initial adjustment of the timings of the received synchronisation pulses 21 in a slope correction block 54. This initial adjustment alters the relative timings of the received synchronisation pulses 21 of the received frame to correct for the calculated clock slope, so that the relative timings of the received synchronisation pulses 21 more accurately correspond to the known relative timings of the transmitted synchronisation pulses 21. In some examples this initial adjustment may be carried out by keeping the timing of the first pulse of the received frame fixed, and altering the relative timings of subsequent pulses based on the calculated clock slope. However, in other examples a different adjustment technique may be used.

Following the initial adjustment in the slope correction block 54, the timing recovery module 19 correlates the received synchronisation pulses to the known pulses of the pseudo random pattern in a match pulse patterns block 55.

Figure 6:
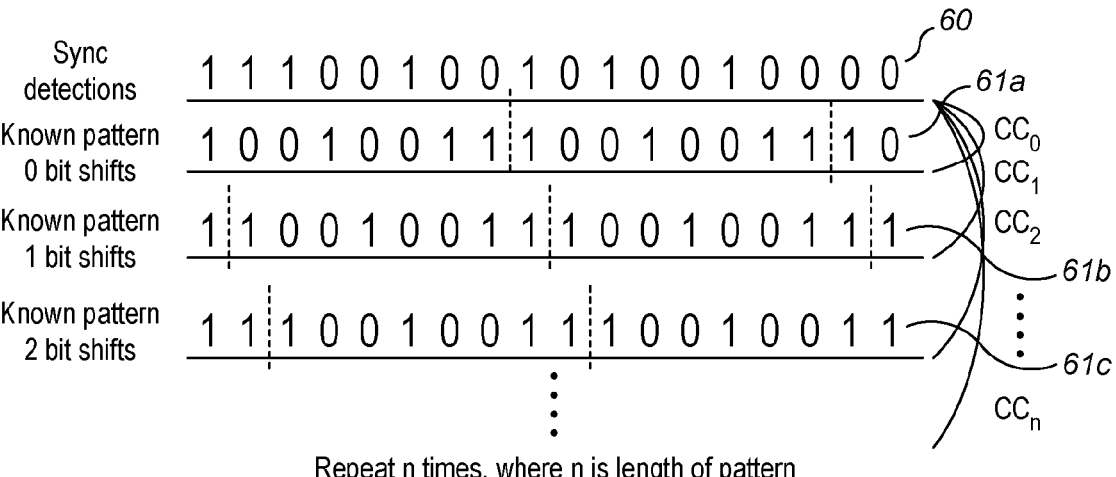
FIG. 6 is an explanatory diagram illustrating a correlation process carried out at a ground station according to the first embodiment.

FIG. 6 is an explanatory diagram showing the correlation process carried out in the match pulse patterns block 55. The timing recovery module 19 correlates the adjusted synchronisation pulses 60, that is, the received synchronisation pulses 21 after the initial timing adjustment based on the calculated clock slope, to the known pulses 61a of the pseudo random pattern bit-by-bit, and determines the correlation coefficient $CC_0$ for the correlation. A correlation coefficient indicates the quality of matching between two patterns, in this case the percentage of matched values between the known and detected pulse sequences.

The timing recovery module 19 then repeats the correlation process and correlates the received synchronisation pulses to the known pulses 61b of the pseudo random pattern shifted by one pulse (one bit), and determines a correlation coefficient $CC_1$ for the correlation. This is repeated for the full number of pulses in the pseudo random pattern, so that a correlation coefficient is determined for every possible relationship between the received and transmitted pulse patterns.

The timing recovery module then compares the determined correlation coefficients and identifies the relative position having the highest correlation coefficient as the correct relative position of the adjusted synchronisation pulses to the transmitted pseudo random pulse pattern, and so identifies the relationship of the local clock time at the OGR 3 to the clock time at the satellite 2. Comparing the correlation at different positions in this way allows the correct relative time positions of the received and transmitted pulse patterns to be determined even when some of the received pulses may be incorrect. In any received pseudo random pattern frame some transmitted pulses may not be received, for example due to clouds, so that transmitted ones are incorrectly received as zeros. In principle, some transmitted zeros could be incorrectly received as ones, but this is less likely.

When the correct relative position of the corrected synchronisation pulses to the transmitted pseudo random pulse pattern has been identified, the first received synchronisation pulse can be matched to the corresponding transmitted synchronisation pulse, and to the quantum link start time, so that the time when the first received pulse was transmitted by the satellite 2 and received by the OGR 3 can be matched as to, so that the satellite 2 and the OGR 3 can have the same knowledge of the timing of the first photon transmitted through the quantum beam, and they are agreed which photon ID is photon ID=1, the first photon transmitted through the quantum beam at the start of the QKD session.

Then, the timing recovery module 19 calculates a synchronising conversion of OGR time according to the clock of the OGR 3 to satellite time according to the clock 12 of the satellite 2 in a curve fitting block 56. The timing recovery module 19 carries out the curve fitting by taking the matched relative positions of the adjusted received synchronisation pulses and the sent pseudo random pulse pattern identified in the match pulse patterns block 55, and fitting a function, such as a polynomial function, to the relationship between the OGR time (the time according to the local clock 22) indicated by the adjusted received synchronisation pulse times and the satellite time (the time according to the shared clock 12) indicated by the transmitted synchronisation pulse times over a short period of time, for example 1 second. The determined function, such as a polynomial function, defines the relationship between the emission times at the satellite 2 and the actual detection times at the OGR 3. The pulse travel time between the satellite 2 and the OGR 3 is constantly changing, so that the relationship between the emission times and the detection times is also constantly changing, so that the use of a polynomial function for the fitting may provide greater accuracy than a linear fit. However, the use of a polynomial function is not essential, and in other examples a different function may be used. In some other examples, a regression analysis technique, such as segmented linear regression, or spline fitting, may be used instead of polynomial function fitting. In some other examples, a model of the underlying physical system could be used, and the parameters of the system tuned to fit the data, instead of polynomial function fitting.

Then, the timing recovery module 19 uses the polynomial, or other, function determined in the curve fitting block 56 to convert or translate the single photon reception times to faint pulse laser system pulse emission times in a time translation block 57. As discussed above, the synchronisation pulses have been used to retrieve the relationship between the satellite 2 time and the OGR 3 time, this relationship being defined by the determined polynomial, or other, function. The timing recovery module 19 uses the polynomial, or other, function to translate the reception times of the received single photons of the quantum beam 4 according to the OGR 3 clock, as indicated by the associated time stamps, into the corresponding transmission or sending times at the satellite 2 according to the satellite clock, and so synchronise the timing of the reception times and the sending times.

The timing recovery module 19 then translates the determined synchronised transmission times into photon IDs in a determine photon ID block 58. In the illustrated example the photon IDs are not directly based on the determined transmission times. Instead, the translated reception times, which have been translated into sending times at the satellite 2 according to the satellite clock, are converted to photon IDs by taking the nearest cycle time of the shared clock 12 of the satellite to the determined transmission times. This translation to photon IDs is possible because the synchronisation laser 9 and faint pulse source laser 6 are driven by the same master clock 12 on-board the satellite 2.

The received photon events can then be matched with photon emission events using their respective photon IDs and the satellite 2 and the OGR 3 can use the matched events to perform QKD key post-processing steps in a conventional manner so that they can negotiate and share an identical secure key or keys.

The use of a correlation process in combination with the polynomial fitting provides a method of time translation which is robust to noise and missed pulses, and minimises the probability of incorrect correlation.

The procedure described above may allow sufficiently accurate time synchronisation/translation to support quantum beam pulse repetition rates greater than 1 GHz, with timing errors being reduced to the order of hundreds of picoseconds, compared to previous satellite QKD systems, which typically can support repetition rates of only up to around 100 MHz because of the large timing synchronisation errors. Further, through the use of a pseudo random pulse pattern the pseudo random nature of the pulses may provide greater robustness to noise in the communication channel, which can obscure detection events, and greater robustness to noise introduced in the pulse generation and detection processes. The present approach does not require additional channels or communication between satellite and ground station (OGR). All correlation is performed on the ground at the OGR after reception and detection of time synchronisation pulses from the satellite.

In the illustrated first embodiment the photon ID used is based on the satellite 2 clock cycles. In other examples where a different photon ID is used, the photon ID block 57 may be changed to a different manner of translating the determined times into photon IDs may be used as appropriate. In examples where the transmission or reception time is used directly as the photon ID, the photon ID block may be omitted.

In the illustrated first embodiment the method used to identify the last pulse in each frame of the transmitted pseudo random pattern assumes a relatively small difference in clock rate. In examples where the difference in clock rate may be larger, an alternative method may be used to do this. In some examples this may be done by comparing the times of the received pulses to determine an approximate value of the time difference between received bits (ones or zeros). It will be understood that the time period between successive received pulses (ones) will always be an integer multiple of this value. This value and the known bit length of the pseudo random pattern can then be used to identify the last pulse in the frame.

In the illustrated first embodiment the photon reception times at the OGR 3 according to the OGR clock are translated into photon emission times at the satellite 2 according to the satellite clock. This may provide the advantage of minimising communication between the OGR 3 and the satellite 2, and minimising the amount of computation which must be carried out on the satellite. However, this is not essential, and in principle, the same techniques could be used to translate the photon emission times according to the satellite clock into photon reception times according to the OGR clock. In other examples, the OGR 3 could send the synchronisation pulse detection time information, such as timestamps, to the satellite 2, and the satellite 2 could carry out the time adjustment calculations to allow the received photon events to be matched with corresponding photon emission events.

In practice, it is expected that a time offset will exist between the reception times of the faint pulse source pulses and the synchronisation pulses at the OGR 3 even when the emission of the different pulses is triggered simultaneously, for example by the same clock pulse of the shared clock 12. This may, for example, be due to path length differences on board the satellite, and may also be the result of the different wavelengths of the faint pulse source pulses and the synchronisation pulses causing a variation in travel time through the atmosphere even though the path length through the atmosphere is the same for the different pulses at any given time. Further, in a system using polarisation encoding there may be different time offsets for each polarisation state. Where the BB84 protocol is used there may be four different time offsets for the four different polarisation states of the faint pulse source pulses/single photons.

This fixed time offset will interfere with post processing in a similar manner to any variable time errors, and in general it is desirable that both the fixed offset and the dynamic timing error will need to be corrected. The dynamic timing errors are corrected for each QKD communication session between the satellite 2 and OGR 3 during the communication session, as described above. Optionally, any fixed timing offset can be measured in a dedicated calibration or housekeeping session scheduled between the satellite 2 and the OGR 3. In some examples the time offset(s) may be slowly varying, for example due to thermal or aging effects on system components. In such examples where slowly varying time offsets are expected, the dedicated calibration or housekeeping session may be repeated at intervals to account for these variations. In this context, a slowly varying time offset is one which will not change significantly during a communication session.

In a system using polarisation encoding, such as the illustrated system using the BB84 protocol, the OGR 3 could generate a histogram of photon detection events at each polarisation detector, and analyse the histogram to estimate the timing offsets of the different polarisation channels from one another. This may be done in operation of the system 1 without the need for a dedicated calibration or housekeeping session. However, it is expected that the use of a dedicated calibration or housekeeping session will allow more accurate determination of the fixed time offsets.

In some examples, the offset, or offsets, can be systematically scanned by the satellite 2 in a dedicated housekeeping/calibration mode during which the OGR 3 requests the satellite 2 to send faint pulses having specific states, such as polarisation values, and calculates the quantum bit error rate (QBER) for each state, which in this scenario can be thought of as an indication of the amount of misregistered photons, at different time offset values. At the optimum time offset, where the time offset value corresponds to the actual fixed timing offset, the lowest QBER would be observed. This optimum timing offset can then be used for that state for all subsequent contacts. Further, the optimum timing offset can also be sent to other OGRs 3 to minimise the amount of time that the OGRs 3 and the satellite 2 spend in the housekeeping/calibration mode. In some examples, the determined timing offsets can be sent to a control centre of the satellite QKD system 1 for distribution to other OGRs 3.

In alternative examples, the satellite 2 can send a known sequence of polarisation states in the quantum beam 4 to the OGR 3, such that the time offset could be retrieved through post processing at the OGR 3. An explanatory example of this example is shown in FIG. 7.

Figure 7:
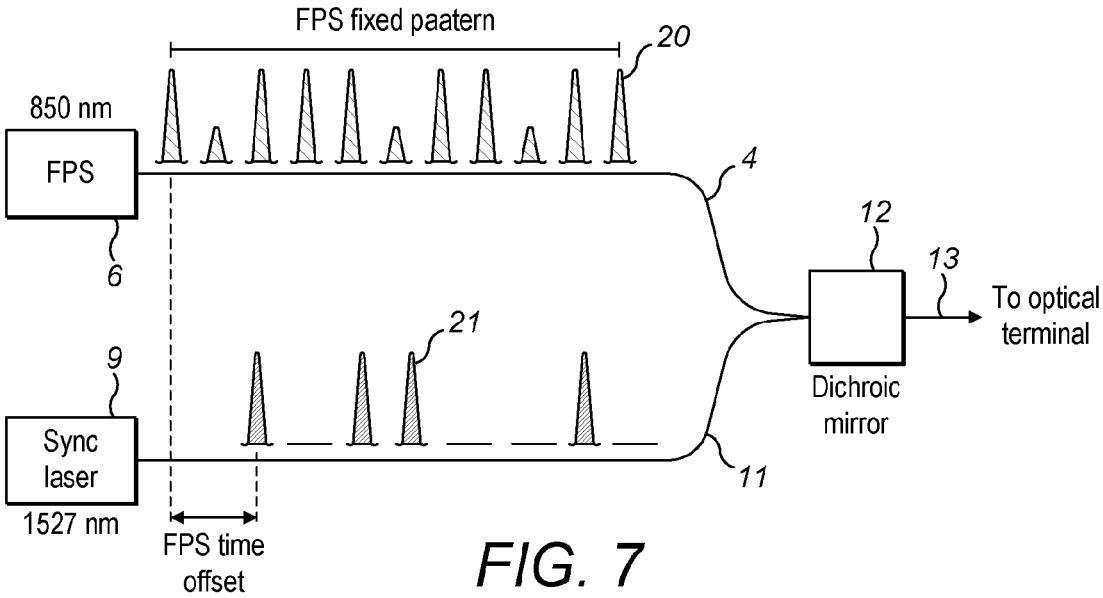
FIG. 7 is a schematic diagram illustrating laser pulse sequences optionally generated on board the satellite according to a specific example of the first embodiment.

As shown in FIG. 7, during a dedicated housekeeping/calibration mode, the satellite 2 emits a known pattern of faint laser pulses 20. This known pattern can conveniently be a stream of predetermined length of each possible polarisation state. The OGR 3 receiving the faint laser pulses 20 would then detect the faint laser pulses and determine the timing offset between each of them and the synchronisation pulses. The determining of the timing offset between each of the faint laser pulses and the synchronisation pulses employs the techniques described above for time slope determination and correction, and matching and fitting of the pseudo random code patterns, and also for the known patterns of faint laser pulses, in order to minimise the impact of satellite movement related delay and Doppler effects, and timing jitter, on the determined timing offset. The determined timing offset for each state can then be used for that state for all subsequent contacts. Further, the determined timing offset for each state can be distributed to other OGRs 3 to minimise the amount of time that the OGRs 3 and the satellite 2 spend in the housekeeping/calibration mode. In some examples, the determined timing offsets can be sent to a control centre of the satellite QKD system 1 for distribution to other OGRs 3.

The first embodiment is described as using the BB84 protocol. In other examples, alternative protocols may be used. In some examples, the BBM92 photon entanglement protocol may be used.

Figure 8:
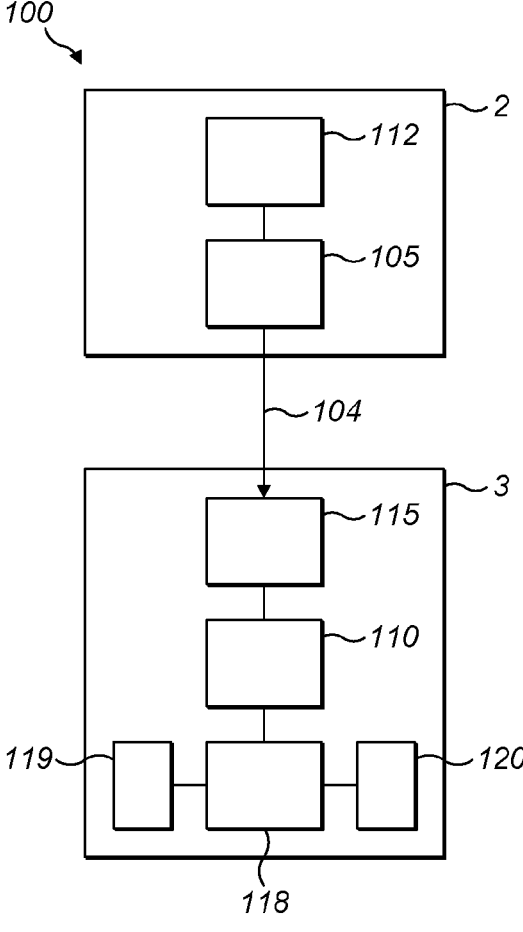
FIG. 8 is a schematic diagram illustrating a satellite quantum key distribution system according to a second embodiment of the invention.

FIG. 8 shows a schematic diagram of a part of a time synchronisation system 100 according to a second embodiment. The time synchronisation system 100 is located on a satellite 2 and an OGR 3.

As shown in FIG. 8, the satellite 2 comprises a pulse generator 105 comprising a faint pulse laser system, which produces a series of faint laser pulses to form a quantum beam 104. The pulse generator 105 generates faint laser pulses which are attenuated to single photon events, which faint laser pulses form the quantum beam 104 suitable for use in quantum key delivery (QKD) protocols. In the illustrated example, the emitted faint laser pulses are assigned photon IDs corresponding to the clock cycle of a clock 112 at which they are emitted. In the illustrated example the QKD system 1 operates using the BB84 polarisation encoding protocol. In some examples the faint laser pulses may be produced by a single photon source.

The quantum beam 104 is directed to the OGR 3 by output optics of the satellite 2 (not shown).

The OGR 3 receives the quantum beam 104 from the satellite 2 using input optics of the OGR 3 (not shown). The OGR 3 comprises a decoding optical system 115 and a number of single photon detectors 116, which receive the quantum beam 104 and detect single photon reception events of the quantum beam 104, and the respective properties of the received photons. In the illustrated example of FIG. 8, the decoding optical system 115 is arranged to decode according to the BB84 polarisation encoding protocol, and the decoding optical system 115 is a polarisation analyser. The output of the single photon detector 116 is provided to a time tagger 118, which time stamps the single photon reception events detected by the single photon detector 116 using a clock signal from an OGR 3 local clock 120. The OGR 3 further comprises a timing recovery module 119.

In the second embodiment, there is no separate synchronisation pulse laser, as used in the first embodiment. Instead, at predetermined times during the communication session between the satellite 2 and the OGR 3, the faint pulse laser system is not used to generate single photons randomly encoded in polarization as a quantum beam for QKD generation. That is, the faint pulse laser system itself is instead used to create a series of synchronization pulses at regular time intervals which are encoded with a pseudo random code, that are used to support the OGR time correlation procedure discussed above with reference to the first embodiment.

In some examples, the predetermined times when the faint pulse laser system is used to create synchronization pulses may be distributed at regular time intervals during the sending of the faint laser pulses 20 forming the quantum beam by the faint pulse laser system. For example, the faint pulse laser system may be used to create a synchronization pulse in place of every n-th faint laser pulse, where n is an integer greater than 1, such as n=100. In other examples, the predetermined times when the faint pulse laser system is used to create synchronization pulses may be distributed at regular time intervals during a dedicated calibration time period when the faint pulse laser system does not send faint laser pulses 20. In order to do this, the pulse generator 105 is arranged to encode the series of predetermined ones of the faint laser pulses in a manner different from the encoding of the remaining faint laser pulses, which remaining faint laser pulses form a series of faint laser pulses which provide the quantum beam.

In the second embodiment, in some examples, this encoding is carried out by allowing photons to be transmitted at a higher intensity, for example without the faint laser pulse source being attenuated down to the single photons level required for quantum transmission, to generate a more intense synchronisation pulse. The single photon detector(s) 116 of the OGR 3 can then be used to detect the synchronisation pulses.

In some examples where a polarisation encoding protocol is used, this encoding may be achieved by allowing photons to be transmitted in all polarization channels, and possibly also at a higher intensity, such as without the source being attenuated down to the single photons level required for quantum transmission, to generate a more intense synchronisation pulse. The single photon detector(s) 116 of the OGR 3 can then be used to detect these synchronisation pulses.

Although only a predetermined part of the faint laser pulses are used to form the series of time synchronisation pulses (for example using every $100^{th}$ pulse), due to the much higher pulse repetition rate of the faint laser pulses than the dedicated synchronisation pulses in the first embodiment, the number and rate of time synchronisation pulses received and available at the OGR 3 receiver in the second embodiment may be substantially equal to, or greater than, in the first embodiment. It is expected that, in the example of faint pulses being emitted ever 500 ps, using every $100^{th}$ faint pulse as a time synchronisation pulse will provide detection rates for synchronisation pulses at a similar frequency to the first embodiment. Although the individual time synchronisation pulses will be weaker because they come from a weaker source, and so will be more difficult to detect, leading to a lower detection probability, their greater rate will allow a similar process to be used to analyse and use the time synchronisation pulses to correct or translate the faint pulse reception times at the OGR 3 to faint pulse transmission times at the satellite 2, or vice-versa The sent and received synchronisation pulses can then be processed by the timing recovery module 119 to determine and adjust for clock slope, and to determine a function, such as a polynomial function, in a similar manner to the first embodiment. This function can then be used to translate the reception times of the received single photons of the quantum beam 104 according to the OGR 103 clock 120, as indicated by the associated time stamps, into the corresponding transmission or sending times at the satellite 2 according to the satellite clock.

The second embodiment may allow the requirement for dedicated equipment to generate and receive the synchronization laser pulses to be eliminated on both the satellite and the OGR. Further, this may simplify optical design of the satellite and reduce the impact of atmospheric divergence between the synchronisation and quantum laser downlinks. However this approach may not be compatible with some protocols, such as the BBM92 or E91 entanglement based protocols. Further, this approach may present difficulties for BB84, or other prepare and measure protocols due to the strenuous requirements this places on the FPS between its maximally on and maximally off states.

A time synchronisation method according to a third embodiment may also be carried out using the synchronisation system 100 illustrated in FIG. 8.

According to the third embodiment, the synchronisation system 100 is located on a satellite 2 and an OGR 3 comprising corresponding components to those described above with reference to the second embodiment. Similarly to the second embodiment, the satellite 2 generates a quantum beam 104 comprising a series of faint laser pulses, and this quantum beam 104 is received, and single photon reception events of the quantum beam 104 detected, together with the respective properties of the received photons, by the OGR 3.

In the third embodiment, similarly to the second embodiment, there is no separate synchronisation pulse laser, as used in the first embodiment. Instead, in the third embodiment, during the communication session between the satellite 2 and the OGR 3, the system 100 is arranged to use a series of predetermined ones of the faint laser pulses as a series of time synchronisation pulses.

In order to do this, the pulse generator 105 is arranged to encode the series of predetermined ones of the faint laser pulses in a predetermined manner. In some examples, this encoding may comprise encoding the predetermined ones of the faint laser pulses with a significant bias between different states compared to the relationship between the different encoding states for the remaining faint laser pulses. In examples encoded using different polarisation states where the faint laser pulses are encoded with a plurality of different polarisation states, the predetermined ones of the faint laser pulses may be encoded with only a sub-set of these different polarisation states, and with a different bias between the states of this sub-set compared to the remaining faint laser pulses. For example, the system 100 may be arranged to use each $100^{th}$ faint laser pulse as a time synchronisation pulse, so that the series of $100^{th}$ faint laser pulses form a series of time synchronisation pulses. In some examples using the BB84 polarisation encoded protocol, the pulse generator 105 may be arranged to encode each $100^{th}$ faint laser pulse in the horizontal/vertical (H/V) basis only, with a significant bias between the two states, for example 90% V and 10% H. The pattern of the H and V encodings in this series of faint laser pulses would then provide a predetermined known pseudo random pattern, as discussed with reference to the first embodiment. The single photon detector(s) 116 of the OGR 3 can then be used to detect the synchronisation pulses and their polarisation states For example, the system 100 may be arranged to use each $100^{th}$ faint laser pulse as a time synchronisation pulse, so that the series of $100^{th}$ faint laser pulses form a series of time synchronisation pulses. In some examples, the pulse generator 105 may be arranged to encode each $100^{th}$ faint laser pulse in the horizontal/vertical (H/V) basis only, with a significant bias between the two states, for example 90% V and 10% H. The pattern of the H and V encodings would be a predetermined known pseudo random pattern, as discussed with reference to the first embodiment.

Although only a predetermined part of the faint laser pulses are used to form the series of time synchronisation pulses (in the example using every $100^{th}$ pulse, 1 percent of the faint laser pulses are used as the series of time synchronisation pulses), due to the much higher pulse repetition rate of the faint laser pulses than the dedicated synchronisation pulses in the first embodiment, the number and rate of time synchronisation pulses available at the OGR 3 receiver in the third embodiment may be greater than in the first embodiment. It is expected that, in the example of faint pulses being emitted ever 500 ps, using every $100^{th}$ faint pulse as a time synchronisation pulse will provide detection rates for synchronisation pulses at a similar frequency to the first embodiment. Although the individual time synchronisation pulses will be weaker because they come from a weaker source, and so will be more difficult to detect, leading to a lower detection probability, their greater rate will allow a similar process to be used to analyse and use the time synchronisation pulses to correct or translate the faint pulse reception times at the OGR 3 to faint pulse transmission times at the satellite 2, or vice-versa.

In the third embodiment, the same principles may be used to carry out the time correction/translation, although the processing of the received time synchronisation pulses will generally be more complex. For example, in the third embodiment a fast-fourier transform (FFT) may be used on the faint pulse detection events to extract an estimate of the system repetition rate (that is, the faint pulse detection rate at the OGR 3), and this could be used to determine the time slope, as an alternative to determining the time slope from the series of time synchronisation pulses only. However, the method of obtaining the pseudo-random pattern and using this to obtain a function translating or correcting the faint pulse reception times at the OGR 3 to faint pulse transmission times at the satellite 2, or vice-versa, would be the same.

The third embodiment may allow the requirement for dedicated equipment to generate and receive the synchronization laser pulses to be eliminated on both the satellite and the OGR. Further, this may simplify optical design of the satellite and reduce the impact of atmospheric divergence between the synchronisation and quantum laser downlinks. However this approach may impose key rate overhead, and may introduce additional encoding and quantum downlink decoding complexity. Further, without wishing to be bound by theory, it is expected that this approach may be more sensitive to errors and attenuations introduced in the link due to the decreased power of the quantum beam compared to a dedicated synchronisation beam.

The embodiments described above have a quantum downlink beam from a satellite to a ground station, with various components located on the satellite or at the ground station. In alternative examples, this arrangement may be reversed, and the SQKD system may comprise a quantum uplink beam from a ground station to satellite, with the locations of the various system components being reversed. Other arrangements are also possible, where the quantum beam is between two satellites or two ground stations, with the various system components being arranged appropriately at the transmission and reception ends of the quantum beam.

In the embodiments described above, a single quantum beam between a satellite and a ground station is shown. In some examples, such as systems using entanglement based protocols, such as the BBM92 protocol, there may be two quantum beams used simultaneously between a satellite and two different ground stations, with each quantum beam being directed by a separate dedicated optical terminal on the satellite. In such examples, time synchronisation of each of the quantum beams may be independently adjusted by the methods described above. In systems using entanglement based protocols, such as BBM92, where the faint pulse source is used to produce the synchronisation pulses, it will be necessary to provide both a faint pulse source and an entanglement source at the transmitter (the satellite in the illustrated embodiments). In systems using entanglement based protocols, such as BBM92, it will be necessary to have either the same synchronisation laser or faint pulse source laser being split into both downlink optical chains forming a quantum beam, or if a separate synchronisation laser or faint pulse source laser is used for each downlink optical chain forming a quantum beam, these lasers must be synchronised to a common clock, or have any timing offset calibrated out.

In the embodiments described above the faint pulses are single photon events. In other examples, these may be multi-photon events.

In the embodiments described above the system comprises a single optical ground receiver (OGR). The system may comprise any number of OGRs.

In the embodiments described above the system comprises a single satellite. The system may comprise any number of satellites.

In the embodiments described above, each of the satellite and the OGR includes a single dichroic mirror to combine and separate the different optical beams. In other examples, different beam combining or separating arrangements may be used.

In the embodiments described above, a polynomial fit is used. In other examples, different types of fit may be used.

In the embodiments described above, specific laser wavelengths and pulse repetition rates are used. In other examples, different wavelengths and/or pulse repetition rates may be used.

In the embodiments described above, a faint pulse source (FPS) is used to generate the pulses of the quantum beam. In other examples, alternative sources for these pulse may be used, such as true single photon sources, or entanglement pair sources (for use in entanglement protocols such as BB92 or E91). These examples of alternative sources are not exhaustive.

In the embodiments described above, the quantum beam is encoded using the polarisation encoded BB84 protocol. In other examples, different encoding protocols may be used. For example, encoding protocols using other encoding techniques, such as time-bin encoding, or different QKD protocols, such as CV QKD, or different quantum protocols, such as quantum digital signatures, may additionally or alternatively be used in the described embodiments.

In the embodiments described above the system is a quantum key distribution system. In other examples other cryptographic items could be distributed/delivered in addition to, or as an alternative to, encryption keys. Examples of such other cryptographic items include cryptographic tokens, cryptographic coins, or value transfers.

In the embodiments described above, it is assumed that the components of the system are of sufficiently high specification to allow the time-synchronisation to take place. This refers to the jitter in the system, resolution of the detection and the efficiency of detection of the pulses. The precise specifications required will depend upon the characteristics of the system in any specific implementation.

In the described embodiments of the invention parts of the system may be implemented as a form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media imple-
mented in any method or technology for storage of infor-
mation such as computer readable instructions, data struc-
tures, program modules or other data. A computer-readable
storage media can be any available storage media that may
be accessed by a computer. By way of example, and not
limitation, such computer-readable storage media may com-
prise RAM, ROM, EEPROM, flash memory or other
memory devices, CD-ROM or other optical disc storage,
magnetic disc storage or other magnetic storage devices, or
any other medium that can be used to carry or store desired
program code in the form of instructions or data structures
and that can be accessed by a computer. Disc and disk, as
used herein, include compact disc (CD), laser disc, optical
disc, digital versatile disc (DVD), floppy disk, and blu-ray
disc (BD). Further, a propagated signal is not included
within the scope of computer-readable storage media. Com-
puter-readable media also includes communication media
including any medium that facilitates transfer of a computer
program from one place to another. A connection, for
instance, can be a communication medium. For example, if
the software is transmitted from a website, server, or other
remote source using a coaxial cable, fiber optic cable,
twisted pair, DSL, or wireless technologies such as infrared,
radio, and microwave are included in the definition of
communication medium. Combinations of the above should
also be included within the scope of computer-readable
media.

Alternatively, or in addition, the functionality described
herein can be performed, at least in part, by one or more
hardware logic components. For example, and without limi-
tation, hardware logic components that can be used may
include Field-programmable Gate Arrays (FPGAs), Pro-
gram-specific Integrated Circuits (ASICs), Program-specific
Standard Products (ASSPs), System-on-a-chip systems
(SOCs), Complex Programmable Logic Devices (CPLDs),
etc.

Although illustrated as a single system, it is to be under-
stood that a system may be a distributed system.

It will be understood that the benefits and advantages
described above may relate to one embodiment or may relate
to several embodiments. The embodiments are not limited to
those that solve any or all of the stated problems or those that
have any or all of the stated benefits and advantages.
Variants should be considered to be included into the scope
of the invention.

Any reference to 'an' item refers to one or more of those
items. The term 'comprising' is used herein to mean includ-
ing the method steps or elements identified, but that such
steps or elements do not comprise an exclusive list and a
method or apparatus may contain additional steps or ele-
ments.

As used herein, the terms "component" and "system" are
intended to encompass computer-readable data storage that
is configured with computer-executable instructions that
cause certain functionality to be performed when executed
by a processor. The computer-executable instructions may
include a routine, a function, or the like. It is also to be
understood that a component or system may be localized on
a single device or distributed across several devices.

Further, as used herein, the term "exemplary" is intended
to mean "serving as an illustration or example of some-
thing".

Further, to the extent that the term "includes" is used in
either the detailed description or the claims, such term is
intended to be inclusive in a manner similar to the term

22

"comprising" as "comprising" is interpreted when employed
as a transitional word in a claim.

The figures illustrate exemplary methods. While the
methods are shown and described as being a series of acts
that are performed in a particular sequence, it is to be
understood and appreciated that the methods are not limited
by the order of the sequence. For example, some acts can
occur in a different order than what is described herein. In
addition, an act can occur concurrently with another act.
Further, in some instances, not all acts may be required to
implement a method described herein.

Moreover, the acts described herein may comprise com-
puter-executable instructions that can be implemented by
one or more processors and/or stored on a computer-read-
able medium or media. The computer-executable instruc-
tions can include routines, sub-routines, programs, threads
of execution, and/or the like. Still further, results of acts of
the methods can be stored in a computer-readable medium,
displayed on a display device, and/or the like.

The order of the steps of the methods described herein is
exemplary, but the steps may be carried out in any suitable
order, or simultaneously where appropriate. Additionally,
steps may be added or substituted in, or individual steps may
be deleted from any of the methods without departing from
the scope of the subject matter described herein. Aspects of
any of the examples described above may be combined with
aspects of any of the other examples described to form
further examples without losing the effect sought.

It will be understood that the above description of pre-
ferred embodiments is given by way of example only and
that various modifications may be made by those skilled in
the art. What has been described above includes examples of
one or more embodiments. It is, of course, not possible to
describe every conceivable modification and alteration of
the above devices or methods for purposes of describing the
aforementioned aspects, but one of ordinary skill in the art
can recognize that many further modifications and permu-
tations of various aspects are possible. Accordingly, the
described aspects are intended to embrace all such altera-
tions, modifications, and variations that fall within the scope
of the appended claims.

The invention claimed is:

1. A method of time synchronization in a satellite based
quantum key distribution (QKD) system, the method com-
prising:

at a transmitter, emitting a first series of laser pulses, the
first series of laser pulses being encoded to form a
quantum beam;

at the transmitter, emitting a second series of laser pulses,
the second series of laser pulses having a predeter-
mined repeating pattern; and at the transmitter, sending the first and second series of
laser pulses to a receiver;

at a receiver, receiving the first series of laser pulses and
the second series of laser pulses at the receiver and
determining reception times of pulses of the first series
of laser pulses and pulses of the second series of laser
pulses;

comparing the received second series of laser pulses to the
predetermined pattern at different points in the prede-
termined pattern, and determining the point at which
the received second series of laser pulses is most
strongly correlated to the predetermined pattern;

with the received second series of laser pulses aligned to
the predetermined pattern at the determined point,
determining a relationship fitting respective reception
times of a plurality of the received second series of laser pulses to respective emission times of corresponding ones of the second series of laser pulses; and using the determined relationship to convert between reception times of the first series of laser pulses and emission times of corresponding ones of the first series of laser pulses.

2. The method as claimed in claim 1, wherein the predetermined pattern comprises a series of frames, and the comparing the received second series of laser pulses to the predetermined pattern at different points in the predetermined pattern, and the determining the point at which the received second series of laser pulses is most strongly correlated to the predetermined pattern, are carried out for each frame of the predetermined pattern.

3. The method as claimed in claim 1, wherein the second series of laser pulses have a predetermined baud rate according to a transmitter clock; and the method further comprising:

measuring the baud rate of the second series of laser pulses at the receiver using a receiver clock;

comparing the measured baud rate to the predetermined baud rate to determine a clock slope corresponding to a difference between a receiver clock rate and an apparent transmitter clock rate; and using the clock slope to adjust the determined reception times of pulses of the first series of laser pulses before comparing the received second series of laser pulses to the predetermined pattern at different points in the predetermined pattern.

4. The method as claimed in claim 3, wherein the predetermined pattern comprises a series of frames, and wherein measuring the baud rate of the second series of laser pulses at the receiver using a receiver clock comprises:

measuring a total time taken to receive a frame of the predetermined pattern using the receiver clock;

determining the difference between the measured total time and a total frame time at the predetermined baud rate; and dividing the difference between the measured total time and the total frame time by a number of symbols in the frame.

5. The method as claimed in claim 1, wherein the first series of laser pulses have a first wavelength, and the second series of laser pulses have a second wavelength different from the first wavelength.

6. The method as claimed in claim 1, wherein the first series of laser pulses are encoded with a plurality of different polarization states and the second series of laser pulses are encoded using a sub-set of the plurality of different polarization states.

7. The method as claimed in claim 1, wherein the first series of laser pulses are encoded with a plurality of different polarization states through different polarization channels, wherein the method further comprises:

generating a histogram of photon detection events having different polarization states; and analyzing the histogram to determine time offsets between the different polarization channels.

8. The method as claimed in claim 1, wherein the method further comprises a calibration mode, the method further comprising, in the calibration mode:

at the transmitter, emitting a third series of laser pulses having specific predetermined encoding states, and emitting the second series of laser pulses, and sending the third series of laser pulses and the second series of laser pulses to the receiver;

at the receiver, receiving the second series of laser pulses and the third series of laser pulses and determining reception times of pulses of the second series of laser pulses and pulses of the third series of laser pulses;

calculating a quantum error bit rate (QBER) for the third laser pulses having each encoding state at each of a plurality of different time offset values relative to a timing of pulses of the second series of laser pulses; and for each encoding state, identifying a time offset value having the lowest QBER as the timing offset value for laser pulses having that encoding state from a timing of pulses of the second series of laser pulses.

9. The method as claimed in claim 1, wherein the method further comprises a calibration mode, the method further comprising, in the calibration mode:

at the transmitter, emitting a third series of laser pulses having specific predetermined encoding states, and emitting the second series of laser pulses, and sending the third series of laser pulses and the second series of laser pulses to the receiver;

at the receiver, determining a timing offset between the ones of the third series of laser pulses having each encoding state and the timing of pulses of the second series of laser pulses.

10. The method as claimed in claim 1, wherein the transmitter is on a satellite.

11. A system for time synchronization in a satellite based quantum key distribution (QKD) system, the system comprising:

a transmitter arranged to:

emit a first series of laser pulses, the first series of laser pulses being encoded to form a quantum beam;

emit a second series of laser pulses, the second series of laser pulses having a predetermined repeating pattern; and send the first and second series of laser pulses to a receiver; and a receiver arranged to receive the first series of laser pulses and the second series of laser pulses and determine reception times of pulses of the first series of laser pulses and pulses of the second series of laser pulses;

the system being arranged to:

compare the received second series of laser pulses to the predetermined pattern at different points in the predetermined pattern, and determine the point at which the received second series of laser pulses is most strongly correlated to the predetermined pattern;

with the received second series of laser pulses aligned to the predetermined pattern at the determined point, determine a relationship fitting respective reception times of a plurality of the received second series of laser pulses to respective emission times of corresponding ones of the second series of laser pulses; and use the determined relationship to convert between reception times of the first series of laser pulses and emission times of corresponding ones of the first series of laser pulses.

12. The system as claimed in claim 11, wherein the predetermined pattern comprises a series of frames, and the comparing the received second series of laser pulses to the predetermined pattern at different points in the predetermined pattern, and the determining the point at which the received second series of laser pulses is most strongly correlated to the predetermined pattern, are carried out for each frame of the predetermined pattern.

13. The system as claimed in claim 11, wherein:

the transmitter further comprises a transmitter clock, and the transmitter is arranged to emit the second series of laser pulses with a predetermined baud rate according to the transmitter clock;

the receiver further comprising a receiver clock and measuring means arranged to measure the baud rate of the second series of laser pulses using the receiver clock; and the system being arranged to:

compare the measured baud rate to the predetermined baud rate to determine a clock slope corresponding to a difference between a receiver clock rate and an apparent transmitter clock rate; and use the clock slope to adjust the determined reception times of pulses of the first series of laser pulses before comparing the received second series of laser pulses to the predetermined pattern at different points in the predetermined pattern.

14. The system as claimed in claim 13, wherein the predetermined pattern comprises a series of frames, and wherein measuring the baud rate of the second series of laser pulses at the receiver using a receiver clock comprises:

measuring a total time taken to receive a frame of the predetermined pattern using the receiver clock;

determining the difference between the measured total time and a total frame time at the predetermined baud rate; and dividing the difference between the measured total time and the total frame time by a number of symbols in the frame.

15. The system as claimed in claim 11, wherein the first series of laser pulses have a first wavelength, and the second series of laser pulses have a second wavelength different from the first wavelength.

16. The system as claimed in claim 11, wherein the system is arranged to encode the first series of laser pulses with a plurality of different polarization states, and to encode the second series of laser pulses using a sub-set of the plurality of different polarization states.

17. The system as claimed in claim 11, wherein the transmitter is arranged to encode the first series of laser pulses with a plurality of different polarization states through different polarization channels; and the system is further arranged to:

generate a histogram of photon detection events having different polarization states; and analyze the histogram to determine time offsets between the different polarization channels.

18. The system as claimed in claim 11, in which the system is further arranged to operate in a calibration mode, wherein, in the calibration mode:

the transmitter is arranged to emit a third series of laser pulses having specific predetermined encoding states, and to emit the second series of laser pulses, and to send the third series of laser pulses and the second series of laser pulses to the receiver;

the receiver is arranged to receive the second series of laser pulses and the third series of laser pulses and to determine reception times of pulses of the second series of laser pulses and pulses of the third series of laser pulses;

the system being arranged to calculate a quantum error bit rate (QBER) for the third laser pulses having each encoding state at each of a plurality of different time offset values relative to a timing of pulses of the second series of laser pulses; and for each encoding state, to identify a time offset value having the lowest QBER as the timing offset value for laser pulses having that encoding state from a timing of pulses of the second series of laser pulses.

19. The system as claimed in claim 11, in which the system is further arranged to operate in a calibration mode, wherein, in the calibration mode:

the transmitter is arranged to emit a third series of laser pulses having specific predetermined encoding states, and to emit the second series of laser pulses, and to send the third series of laser pulses and the second series of laser pulses to the receiver;

the receiver is arranged to determine a timing offset between the ones of the third series of laser pulses having each encoding state and the timing of pulses of the second series of laser pulses.

20. A computer-readable medium comprising code or computer instructions stored thereon, which when executed by a processor, causes the processor to:

at a transmitter, emit a first series of laser pulses, the first series of laser pulses being encoded to form a quantum beam;

at the transmitter, emit a second series of laser pulses, the second series of laser pulses having a predetermined repeating pattern; and at the transmitter, send the first and second series of laser pulses to a receiver;

at a receiver, receive the first series of laser pulses and the second series of laser pulses at the receiver and determine reception times of pulses of the first series of laser pulses and pulses of the second series of laser pulses;

compare the received second series of laser pulses to the predetermined pattern at different points in the predetermined pattern, and determine the point at which the received second series of laser pulses is most strongly correlated to the predetermined pattern;

with the received second series of laser pulses aligned to the predetermined pattern at the determined point, determine a relationship fitting respective reception times of a plurality of the received second series of laser pulses to respective emission times of corresponding ones of the second series of laser pulses; and use the determined relationship to convert between reception times of the first series of laser pulses and emission times of corresponding ones of the first series of laser pulses.

* * * * *